(12) United States Patent
Kato

(10) Patent No.: US 6,248,681 B1
(45) Date of Patent: *Jun. 19, 2001

(54) CERAMIC CUTTING TOOL

(75) Inventor: Hideki Kato, Ichinomiya (JP)

(73) Assignee: NGK Spark Plug Co., Ltd., Aichi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,752

(22) Filed: Dec. 28, 1998

(30) Foreign Application Priority Data

Dec. 25, 1997 (JP) ................................................ 9-368547

(51) Int. Cl.$^7$ ............................. C04B 35/56; C04B 35/117
(52) U.S. Cl. ............................. 501/87; 501/96.1; 501/127
(58) Field of Search ............................. 501/87, 96.1, 127

(56) References Cited

U.S. PATENT DOCUMENTS

| | | |
|---|---|---|
| 3,886,254 | 5/1975 | Tanaka et al. . |
| 4,632,910 | 12/1986 | Lee et al. .............................. 501/97 |
| 4,839,315 | 6/1989 | Suzuki et al. .......................... 501/87 |
| 5,017,524 | * 5/1991 | Moskowitz et al. .................... 501/87 |
| 5,196,385 | 3/1993 | Suzuki et al. .......................... 501/87 |
| 5,387,561 | * 2/1995 | Watanabe et al. ...................... 501/87 |
| 5,439,854 | 8/1995 | Suzuki et al. .......................... 501/91 |
| 5,462,901 | * 10/1995 | Egami et al. .......................... 501/87 |
| 5,955,390 | * 9/1999 | Mehrotra et al. ...................... 501/87 |

FOREIGN PATENT DOCUMENTS

| | | | |
|---|---|---|---|
| 0 174 463 | 3/1986 | (EP) . | |
| 0 174 463 | 10/1988 | (EP) | ............................. C04B/35/71 |
| 0592871A1 | 4/1994 | (EP) | ............................. C04B/35/80 |
| 1 600 142 | 7/1970 | (FR) . | |
| 61-17473 | 1/1986 | (JP) | ............................. C04B/35/58 |
| 61-26564 | 2/1986 | (JP) | ............................. C04B/35/56 |
| 61-31358 | 2/1986 | (JP) | ............................. C04B/35/58 |
| 61-10416 | 3/1986 | (JP) | ............................. C04B/35/58 |
| 62-36065 | 2/1987 | (JP) | ............................. C04B/35/56 |
| 63-225579 | 9/1988 | (JP) | ............................. C04B/35/56 |
| 2-25866 | 6/1990 | (JP) | ............................. C04B/35/56 |
| 6-122563 | 5/1994 | (JP) | ............................. C04B/35/80 |
| 8-16028 | 2/1996 | (JP) | ............................. C04B/35/56 |

* cited by examiner

*Primary Examiner*—Karl Group
(74) *Attorney, Agent, or Firm*—Sughrue, Mion, Zinn, Macpeak & Seas, PLLC

(57) ABSTRACT

Disclosed is a ceramic cutting tool comprising in its essential part a ceramic material comprising, in one aspect, a titanium carbonitride-based hard phase and an alumina-based phase, wherein the ceramic material satisfies the following relationships:

10 wt % $\leq$ weight of $Al_2O_3$ $\leq$ 45 wt %;

51 wt % $\leq$ weight of TiCN $\leq$ 89.5 wt %; and 96 wt % $\leq$ weight of $Al_2O_3$+weight of TiCN $\leq$ 99.5 wt % wherein the weight of $Al_2O_3$ indicates the weight content of aluminum as calculated in terms of $Al_2O_3$; and the weight of TiCN indicates the weight content of said titanium carbonitride hard phase, with the proviso that the weight of TiCN is defined by the weight of Ti+ the weight of C+ the weight of N, in which weight of Ti, C, and N are the weight contents of the titanium component, carbon component, and nitrogen component, respectively.

7 Claims, 3 Drawing Sheets

$\psi = 15°$ $\delta = 6°$

CERAMIC CUTTING TOOL

FIELD OF THE INVENTION

The present invention relates to a ceramic cutting tool. More particularly, the present invention relates to a ceramic cutting tool suitable for cutting of, e.g., ductile cast iron (nodular graphite cast iron).

BACKGROUND OF THE INVENTION

In recent years, the rise in the speed and efficiency of machining has been in rapid progress. High performance ceramic materials which can cope with this tendency have been desired. For example, titanium carbide exhibits a high melting point and hardness and a low thermal expansion coefficient and shows no drop of thermal conductivity at high temperatures. Thus, titanium carbide is known as a high-temperature material having a high spalling resistance. However, titanium carbide can hardly be sintered. Thus, it has been considered indispensable that titanium carbide is complexed with a metal such as Co and Ni to form a cermet, making it possible to obtain a dense sintered product which can be used for cutting tool, etc. However, cermet has some disadvantages. Since the metals thus incorporated deteriorate the heat resistance of cermet, it can hardly be said that the excellent heat resistance of titanium carbide can be effectively exerted. For example, when used in high speed cutting of an iron-based material of high toughness and ductility, such as ductile cast iron, a cutting tool made of cermet soon comes to an end of its life due to its poor heat resistance.

In order to eliminate these difficulties, a titanium carbide-based ceramic material which comprises a solid solution of a metal in titanium carbide to resist adverse effects at high temperatures and exhibit improved heat resistance has been proposed (JP-B-2-25866 (The term "JP-B" as used herein means an "examined Japanese patent publication"), JP-A-62-36065 (The term "JP-A" as used herein means an "unexamined published Japanese patent application")). Although the ceramic material disclosed in the above publications has a good heat resistance, it disadvantageously exhibits a far lower toughness than the foregoing cermet and is liable to chipping.

On the other hand, as a titanium carbide-based ceramic material which exhibits improved toughness while maintaining its good high-temperature properties there has been proposed one comprising silicon carbide whisker incorporated therein (JP-B-8-16028). Although this titanium carbide-based ceramic material exhibits improved toughness due to the incorporation of silicon carbide whisker, it is disadvantageously liable to reaction of silicon in the whisker with iron in the material to be cut, resulting in remarkable deterioration of abrasion resistance when used in cutting of an iron-based material, particularly ductile cast iron.

SUMMARY OF THE INVENTION

An object of the present invention is to provide a ceramic cutting tool mainly comprising a titanium-based hard phase having an excellent heat resistance and abrasion resistance which exhibits an excellent toughness and is capable of cutting a tough iron-based material such as ductile cast iron.

The ceramic cutting tool defined in a first aspect of the present invention comprises in its essential part a ceramic material mainly comprising a titanium carbonitride-based hard phase mainly comprising titanium carbonitride and an alumina-based phase mainly comprising alumina, said titanium carbonitride-based hard phase and alumina-based phase satisfying the following relationships:

10 wt % $\leq$ weight of $Al_2O_3$ $\leq$ 45 wt %;

51 wt % $\leq$ weight of TiCN $\leq$ 89.5 wt %; and 96 wt % $\leq$ weight of $Al_2O_3$+weight of TiCN $\leq$ 99.5 wt % wherein weight of $Al_2O_3$ indicates the weight content of aluminum as calculated in terms of $Al_2O_3$; and weight of TiCN indicates the weight content of said titanium carbonitride hard phase, with the proviso that WTiCN is defined by WTi+WC+WN in which WTi, WC and WN are the weight content of titanium component, carbon component and nitrogen component, respectively.

DETAILED DESCRIPTION OF THE INVENTION

Figure 1A:
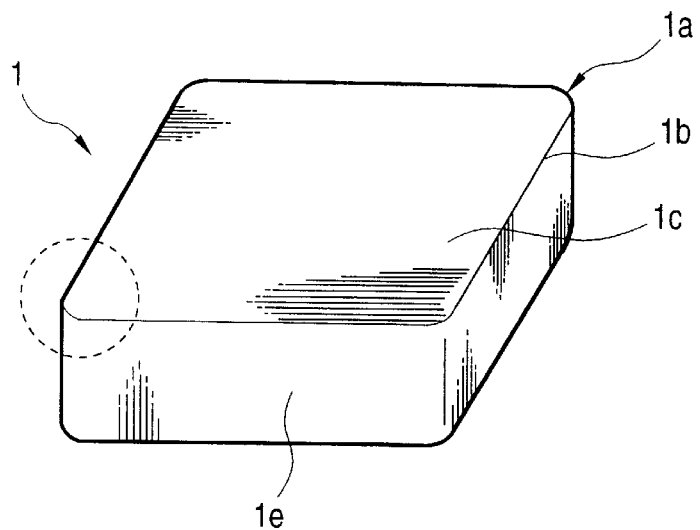
FIGS. 1A, 1B and 1C are perspective view, side partially sectional diagram and partially enlarged view of the ceramic cutting tool specimen used in examples, respectively.

In the ceramic material used for the cutting tool as defined in the first aspect of the present invention, titanium carbonitride, which mainly forms the hard phase has both the advantages of titanium carbide having an excellent heat resistance and a high hardness and titanium nitride having an excellent toughness. Thus, a ceramic cutting tool excellent in heat resistance and abrasion resistance can be realized. Further, alumina which mainly forms the alumina-based phase is a chemically stable substance having an excellent acid resistance which produces a low free energy. The dispersion of alumina in titanium carbonitride makes it possible to improve the acid resistance and chemical stability of the ceramic material as a whole. Thus, even when used in cutting of an iron-based material, the ceramic material does not undergo excessive reaction, making it possible to further improve the abrasion resistance of cutting tool. These effects comprehensively make it possible to cut a tough iron-based material such as ductile cast iron at a high speed and realize a ceramic cutting tool having a prolonged life.

The weight of $Al_2O_3$, which corresponds to the content of alumina in the ceramic material, is adjusted to range from 10 to 45% by weight. The weight of TiCN, which corresponds to the content of titanium carbonitride-based hard phase, is adjusted to range from 51 to 89.5% by weight. Further, the weight of $Al_2O_3$+the weight TiCN is adjusted to range from 96 to 99.5% by weight. These values have the following critical meanings.

If the weight of $Al_2O_3$ falls below 10% by weight, the resulting effect of improving the acid resistance and chemical stability of ceramic material is insufficient. On the contrary, if the weight of $Al_2O_3$ exceeds 45% by weight, the relative content of titanium carbonitride (i.e., weight of TiCN) is reduced, making the ceramic material less heat resistant and hard. It is preferred that $WAl_2O_3$ be adjusted to range from 20 to 30% by weight taking into account the balance of hardness and toughness of the ceramic material.

If the weight of TiCN falls below 51% by weight, the relative content of titanium carbonitride (i.e., the weight of TiCN) is reduced, making the ceramic material less heat resistant and hard. On the contrary, if WTiCN exceeds 89.5% by weight, the relative content of alumina is reduced, making the effect of improving the acid resistance and chemical stability of the ceramic material insufficient. It is preferred that the weight of TiCN be adjusted to range from 66 to 79.5% by weight.

Further, if the weight of $Al_2O_3$+the weight of TICN falls below 96% by weight, the content of alumina and titanium carbonitride which mainly forms the ceramic material is insufficient, making it impossible to obtain desired tool properties. On the other hand, if the weight of $Al_2O_3$+the weight of TICN exceeds 99.5% by weight, the content of a sintering aid component described later is insufficient, making it impossible to obtain a high density sintered product.

The ceramic cutting tool defined in a second aspect of the present invention is a ceramic cutting tool according to the first aspect of the present invention, wherein moles of N/moles of C; +moles of N) and moles of Ti/(moles of C+moles of N) are adjusted to range from more than 0 to not more than 0.5 and from not less than 0.6 to not more than 0.9, respectively, supposing that moles of Ti is the molar content of Ti component in said ceramic material, moles of C is the molar content of C component in said ceramic material and moles of N is the molar content of N component in said ceramic material.

As previously mentioned, titanium carbonitride has both the advantages of titanium carbide having an excellent heat resistance and a high hardness and titanium nitride having an excellent toughness. The adjustment of moles of N/moles of C moles of N value allows the former properties and the latter properties to be well balanced. For example, if it is desired to enhance hardness or heat resistance in particular, moles of N/(moles of C+moles of N) value can be slightly reduced, that is, the content of C component can be increased. On the contrary, if it is desired to secure a higher toughness, moles of N/(moles of C+moles of N) value can be predetermined slightly higher, that is, the content of N component can be increased. However, if moles of N/(moles of C +moles of N) value exceeds 0.5, the resulting ceramic material may have an insufficient hardness or heat resistance. moles of N moles of C+moles of N) value is preferably not more than 0.3.

If moles of Ti/(moles of C+moles of N) value, which is the ratio of the content of Ti component to that of the content of light elements (C, N), falls below 0.6, unstable compounds can be deposited, possibly impairing the chemical stability of the ceramic material or deteriorating the high-temperature properties of the material. On the other hand, if moles of Ti/(moles of C+moles of N) value exceeds 0.9, free light elements can be deposited or the sinterability of the material can be deteriorated, making it easy to form voids that reduce the hardness, toughness or strength of the material.

The ceramic cutting tool defined in a third aspect of the present invention is a ceramic cutting tool according to the first or second aspect of the present invention, wherein the average particle diameter of said titanium carbonitride-based hard phase in said ceramic material is not more than 0.5 μm.

The predetermination of the average particle diameter of the titanium carbonitride-based hard phase to the above defined range makes it possible to realize a ceramic cutting tool further excellent in hardness, strength and toughness. The particle diameter of the titanium carbonitride-phase base hard phase is preferably predetermined to not more than 0.3 μm. The average particle diameter of the alumina phase is preferably predetermined to not more than 1.0 μm to provide ceramic material with sufficient strength and hardness.

The ceramic cutting tool defined in a fourth aspect of the present invention is a ceramic cutting tool comprising in its essential part a ceramic material mainly comprising a titanium carrbide-based hard phase mainly comprising titanium carbide and an alumina-based phase mainly comprising alumina, said titanium carbide-based hard phase and alumina-based phase satisfying the following relationships:

10 wt %≦weight of $Al_2O_3$≦45 wt %;

51 wt %≦weight of TiCN≦89.5 wt %; and 96 wt %≦weight of $Al_2O_3$+WTiC≦99.5 wt % wherein weight of $Al_2O_3$ indicates the weight content of aluminum as calculated in terms of $Al_2O_3$; and weight of TiC indicates the weight content of said titanium carbide hard phase, with the proviso that weight of TiC is defined by weight of TiC+weight of C in which weight of Ti and weight of C are the weight content of titanium component and carbon component, respectively, and the average particle diameter of said titanium carbide-based hard phase being not more than 0.5 μm.

In the ceramic material used for the cutting tool of the fourth aspect of the present invention, titanium carbide which mainly forms the hard phase exhibits an excellent heat resistance and a high hardness. Further, the predetermination of the average particle diameter of the hard phase to not more than 0.5 μm allows the enhancement of toughness, making it possible to realize a ceramic cutting tool excellent in heat resistance, abrasion resistance and toughness. Further, alumina which mainly forms the alumina-based phase is a chemically stable substance having an excellent acid resistance which produces a low free energy. The dispersion of alumina in titanium carbide makes it possible to improve the acid resistance and chemical stability of the ceramic material as a whole. Thus, even when used in cutting of an iron-based material, the ceramic material does not undergo excessive reaction, making it possible to further improve the abrasion resistance of cutting tool. These effects comprehensively make it possible to cut a tough iron-based material such as ductile cast iron at a high speed and realize a ceramic cutting tool having a prolonged life.

The ceramic cutting tool defined in a fifth aspect of the present invention is a ceramic cutting tool according to the fourth aspect of the present invention, wherein the value of Q (=moles of Ti/moles of C) is adjusted to range from 0.6 to 0.9 supposing that KTi is the molar content of Ti component in said ceramic material and KC is the molar content of C component in said ceramic material.

If KTi/KC value, which is the ratio of the content of titanium component to that of light element component (C), falls below 0.6, the high-temperature properties of the material can be deteriorated. On the other hand, if KTi/KC value exceeds 0.9, the sinterability of the material can be deteriorated to form voids that deteriorate the hardness, toughness or strength of the material.

The ceramic cutting tool defined in a sixth aspect of the present invention is a ceramic cutting tool according to any one of the first to fifth aspects of the present invention, wherein said ceramic material comprises a sintering aid component mainly comprising metal oxides other than $Al_2O_3$ incorporated therein in an amount of from 0.5 to 4% by weight.

The incorporation of such a sintering aid component in the ceramic material allows the acceleration of sintering, making it possible to invariably obtain a dense ceramic cutting tool having a high strength. If the content of the sintering aid component falls below 0.5% by weight, the foregoing effects cannot be sufficiently exerted. On the contrary, if the content of the sintering aid component exceeds 4% by weight, the heat resistance of the material can be impaired.

The ceramic cutting tool defined in a seventh aspect of the present invention is a ceramic cutting tool according to any one of the first to sixth aspects of the present invention, wherein said ceramic material comprises one or more metallic components selected from the group consisting of Mg, Ca, Zr, Hf and R (in which R comprises one or more rare earth elements selected from the group consisting of Sc, Y, La, Ce, Pr, Nd, Sm, Eu, Gd, Tb, Dy, Ho, Er, Tm, Yb and Lu) incorporated therein in a total amount of from 0.5 to 4% by weight as calculated in terms of MgO for Mg, CaO for Ca, $ZrO_2$ for Zr, $HfO_2$ for Hf, $CeO_2$ for Ce, $Pr_6O_{11}$ for Pr, $Tb_4O_7$ for Tb and $M_2O_3$ for the rest of the metallic components (in which M represents said rare earth elements excluding Ce, Pr and Tb).

The foregoing metal components may be incorporated in the material in the form of oxide. When sintered, these metal components are melted and vitrified to form a liquid phase that acts as a sintering aid for accelerating sintering. It is presumed that these metal components are mostly present in the ceramic material thus sintered in the form of oxide. However, these metal components often form an amorphous glass phase and thus can be hardly identified in the form of individual oxide. In this case, the total content of these metal components may be from 0.5 to 4% by weight as calculated in terms of individual oxide. If the content of these metal components as calculated in terms of oxide falls below 0.5% by weight, a dense ceramic material can be hardly obtained. On the contrary, if the content of these metal components as calculated in terms of oxide exceeds 4% by weight, the heat resistance of the material can be impaired.

The ceramic cutting tool defined an eighth aspect of the present invention is a ceramic cutting tool according to any one of the first to seventh aspects of the present invention, wherein said ceramic material exhibits a fracture toughness of not less than 5.6 $MPam^{1/2}$.

The ceramic cutting tool defined in a ninth aspect of the present invention is a ceramic cutting tool according to any one of the first to eighth aspects of the present invention, wherein said ceramic material exhibits a Vickers hardness Hv of not less than 2,200.

The employment of the present invention makes it possible to realize a ceramic cutting tool having a high toughness and a high hardness as mentioned above. The ceramic cutting tool thus obtained can cut a tough iron-based material such as ductile cast iron at a high speed without any problems. The fracture toughness value as used herein indicates the value measured by IF method (Indentation-Fracture method) among the fracture toughness testing methods defined in JIS-R1607 (1990).

The process for the production of the foregoing cutting tool (ceramic material) will be described hereinafter.

The mixing and grinding of the starting material powder can be accomplished by means of a known mixing means such as ball mill, attritor and V-type mixer. In titanium carbonitride, the value of moles of N/(moles of C+moles of N) or moles of Ti/(moles of C+moles of N) needs to be adjusted. The adjustment of these values can be accomplished by adjusting the mixing ratio of titanium carbide powder and titanium nitride powder used as starting materials. Alternatively, titanium carbonitride having a desired mixing ratio of carbon and nitrogen may be used. Alternatively, treatment such as nitriding and decarbonization may be effected in a nonoxidizing atmosphere as a sintering atmosphere to adjust the value of KN/(KC+KN) or KTi/(KC+KN).

The foregoing starting material powder may be formed into a desired shape, and then subjected to sintering such as hot pressing, usual sintering and HIP treatment to produce a cutting tool. During sintering, the starting material needs to be heated to a temperature of from 1,500° C. to 2,000° C.

EXAMPLES

The present invention will be further described in the following examples.

As starting materials there were used the following materials:
(1) $TiC_{0.9}$ and $Ti(C_{0.7}N_{0.3})_{0.85}$ having an average particle diameter of 1.0 µm;
(2) $Al_2O_3$ having an average particle diameter of 0.8 µm; and
(3) CaO, MgO, $ZrO_2$, $Y_2O_3$, $Yb_2O_3$ and $Dy_2O_3$ having an average particle diameter of from 0.8 to 2 µm.

The various starting materials were each measured out in a predetermined proportion, and then wet-ground with acetone in a stainless ball mill for 30 hours. Thereafter, the mixture was dried in a dryer to evaporate acetone. Thus, a base powder was obtained.

The base powder was sintered at the sintering temperature set forth in Table 1 by the sintering method set forth in Table 1 to obtain a cutting tool which was then subjected to comparison test with comparative examples. In the present example, the following sintering methods were used:
(1) Hot pressing at a pressure of 200 $kgf/cm^2$ in Ar atmosphere for 30 minutes (hereinafter simply referred to as "H.P");
(2) Usual sintering under reduced pressure in an atmosphere of $(Ar+N_2)$ for 1 hour (hereinafter simply referred to as "NS"); and
(3) Primary sintering under reduced pressure in an atmosphere of $(Ar+N_2)$ for 1 hour, followed by secondary sintering by hot hydrostatic pressure pressing method (HIP) at 1,500° C. and 1,500 atm in Ar atmosphere for 2 hours (hereinafter simply referred to as "HIP")

In the methods (2) and (3), nitriding or decarbonization was effected at the same time with sintering at various mixing proportions of Ar and $N_2$ and atmospheric pressures to adjust the composition of sintered product.

Figure 1B:
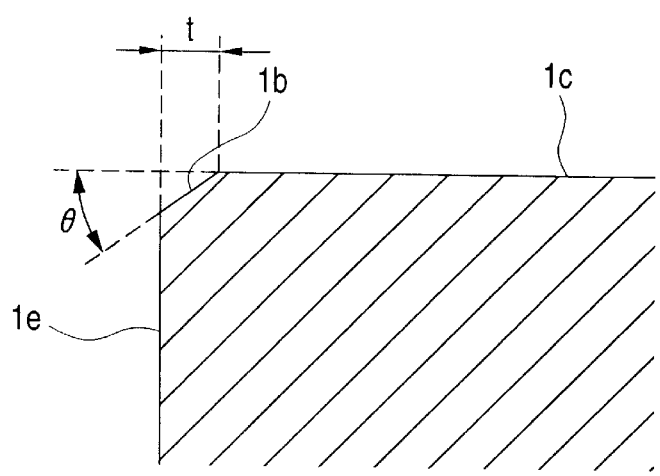
Figure 1C:
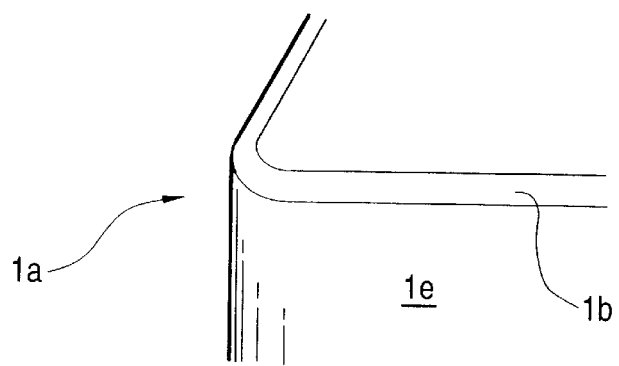

The sintered product thus obtained was polished by a diamond grind wheel to prepare a cutting tool specimen having a shape shown in FIGS. 1A–1C (defined as SNGN120408 in ISO). In some detail, the specimen 1 was a flat prism having an almost square section with a side length of about 12.7 mm and a thickness of about 4.76 mm. The corner 1a had a curvature radius R of about 0.8 mm. The edge portion 1b was chamfered such that the width t of the chamfer on the main plane 1c side was about 0.1 mm and the angle θ of inclination of the chamfer with respect to the main plane 1c was about 25°.

The various specimens were each mirror-polished, and then measured for density ratio to theoretical value (relative density), fracture toughness and Vickers hardness. For the measurement of fracture toughness (Kc), IF method defined in JIS-R1607 (1990) was employed. In some detail, a Vickers indenter was pressed against the specimen under a load of 30 kgf for 30 seconds. Vickers hardness was determined by the dent area and load. The specimen was observed for polished surface by scanning electron microscope. From the image thus obtained, the average particle diameter of titanium carbonitride-based hard phase (or titanium carbide-base hard phase) was determined. The results are set forth in Table 2.

For the determination of the composition of the various specimens, the weight content of Ti component (the weight of Ti), Al component (the weight of Al) and metal component as sintering aid were identified by fluorescent X-ray analysis, and the weight content of C component (the weight of C) and N component (the weight of N) were identified by gas analysis. The weight of Al was then converted to oxide basis to determine the weight content of alumina $WAl_2O_3$. The weight content of the hard phase (the weight of TiCN or the weight of TiC) was determined from the weight of Ti+the weight of C+the weight of N) or the weight of Ti+the weight of C). The various weight contents were converted to molar contents to determine the foregoing value of moles of N/(moles of C+moles of N) and moles of Ti/(moles of C+moles of N). The results are set forth in Table 1. Auger electron spectroscopy and X-ray photoelectron spectroscopy showed that almost all C components and N components are incorporated in the sintered product in the form of compound with titanium, i.e., become incorporated in the titanium carbonitride-based hard phase or titanium carbide-based hard phase.

The various specimens (ceramic cutting tool) were evaluated for cutting properties under the following conditions.

(Cutting test for Abrasion resistance)

Figure 2A:
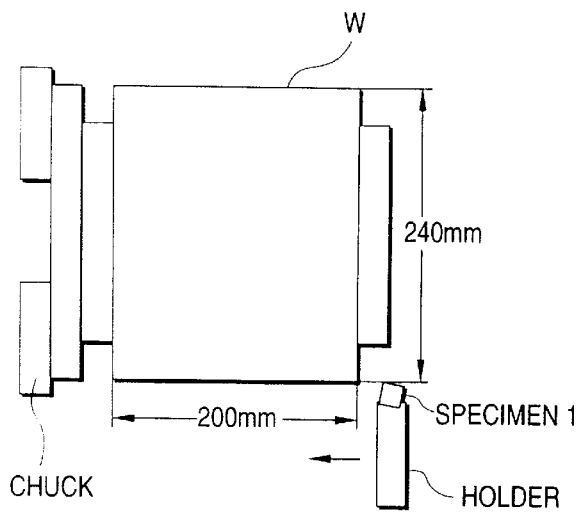
FIGS. 2A, 2B, 2C and 2D are diagrams illustrating the outline of cutting test.
Figure 2B:
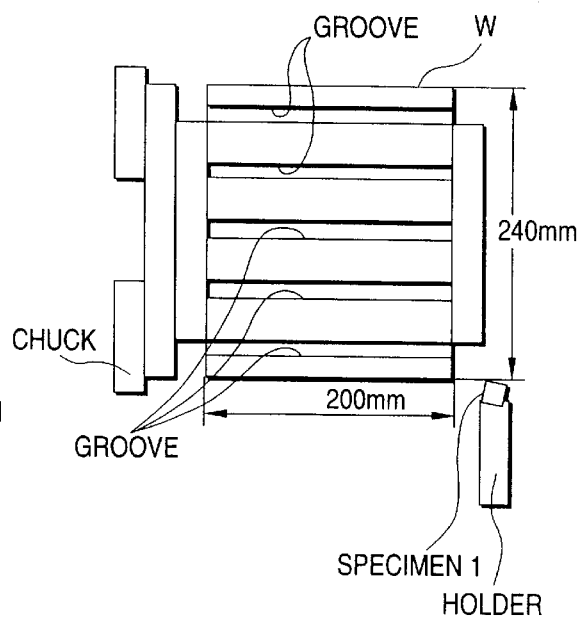
Figure 2C:
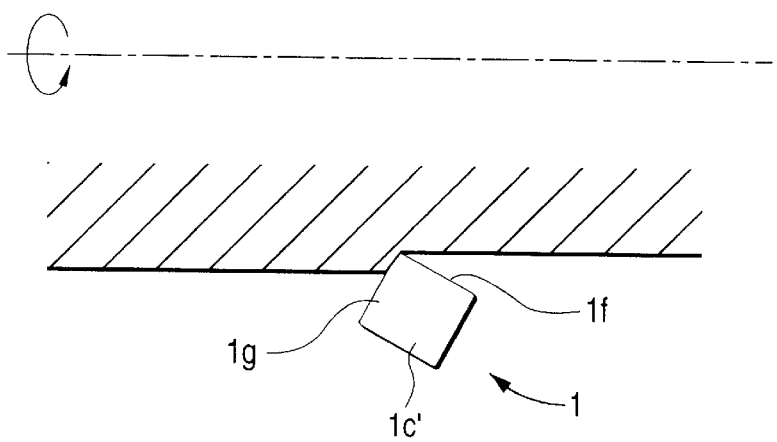

A rod work (working material) W having a shape shown in FIG. 2A was rotated on its axis. The specimen 1 shown in FIGS. 1A–1C supported by a holder was allowed to come in contact with the outer periphery of the work W as shown in FIG. 2C. With one of the main planes 1c as rake surface (hereinafter referred to as "1c'") and the side surface 1e (FIGS. 1A–1C) as relief surface, the outer periphery of the work W was continuously wet-ground under the following conditions:

Work: ductile cast iron (JIS: FCD600), round rod (outer diameter φ: 240 mm; length: 200 mm)

Cutting speed V: 250 m/min.

Feed f: 0.2 mm/rotation

Depth of cut d: 0.5 mm

Cutting oil: water-soluble cutting oil Type W1, No. 1, Z (one defined in JISK2241 (1986), or one having not less than 90% of an emulsified nonvolatile content having a pH value of 8.5 to 10.5 and comprising from 0 to 30% by weight of an aliphatic acid, from 50 to 80% by weight of a mineral oil and from 15 to 35% by weight of a surface active agent)

Figure 3A:
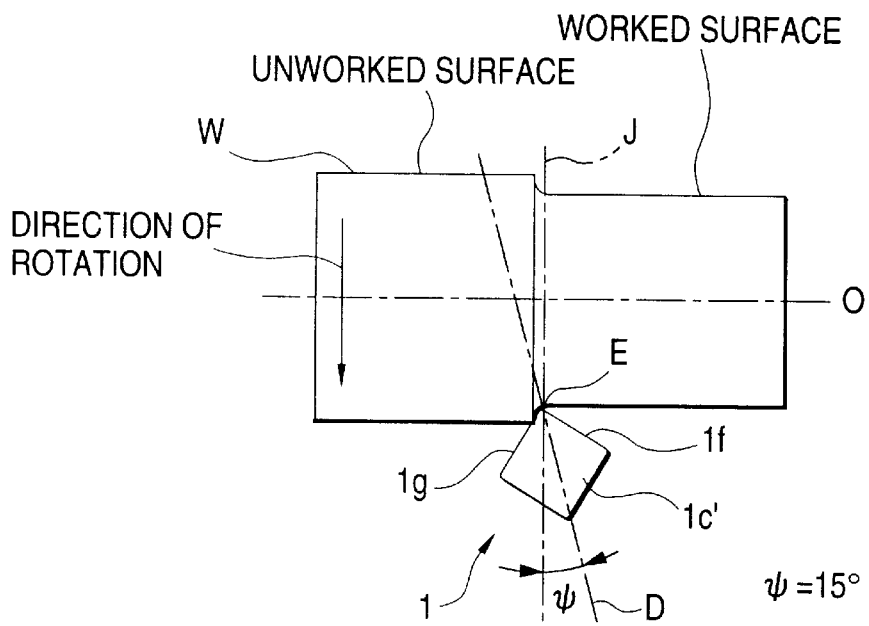
FIGS. 3A–3C are plan, left side, and front views illustrating the position of the ceramic cutting tool specimen with respect to the work in the cutting test.
Figure 3B:
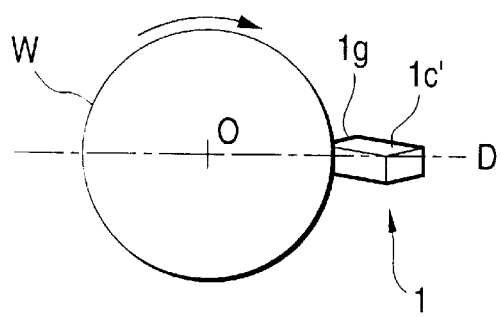
Figure 3C:
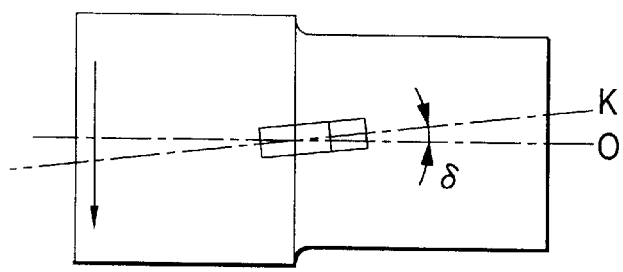

The position of the specimen 1 with respect to the work W is further illustrated in FIGS. 3A–3C. In FIGS. 3A–3C, 1g indicates normal side relief surface, and 1f indicates front relief surface. Furthermore, 0 indicates a central axis of work W, D indicates a straight line passing through the horizontal center of the specimen and parallel to the diagonal line of main plane 1c' (intersects with O), E indicates a point of intersection of D with outer periphery of work W (point of cutting by specimen), J indicates a straight line passing through E and intersecting with O, K a plane passing through the horizontal center of the specimen and parallel to main plane 1c', φ indicates an angle of intersection of J with D, and δ indicates an angle of twist of K with respect to O.

Judgement: After the termination of cutting, the abrasion Vn on the relief surface of the cutting edge (height of abrasion in the cutting direction on the normal side relief surface 1g: see FIG. 2D) was measured.

(Cutting test for loss resistance)

Figure 2D:
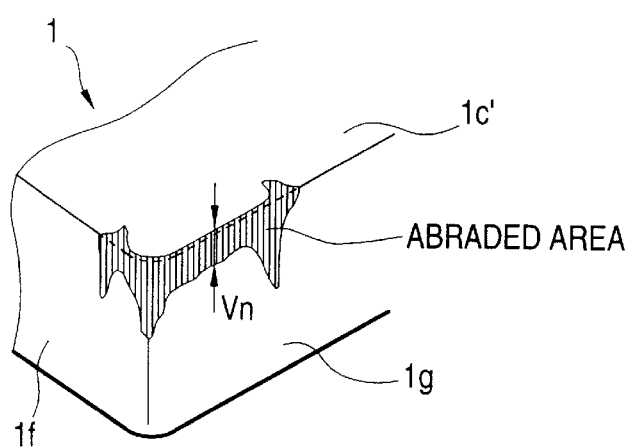

A rod work W having a shape shown in FIG. 2D was rotated on its axis. The specimen 1 shown in FIGS. 1A–1C was allowed to come in contact with the outer periphery of the work W as shown in FIGS. 2C. With one of the main planes 1c as rake surface (hereinafter referred to as "1c'") and the side surface 1e as relief surface, the outer periphery of the work W was continuously wet-ground under the following conditions:

Work: ductile cast iron (JIS: FCD600), round rod having 12 longitudinal grooves provided at regular intervals (outer diameter φ: 240 mm; length: 200 mm; depth of groove: 40 mm; width of groove: 5 mm)

Cutting speed V: 150 m/min.

Feed f: 0.25 mm/rotation

Depth of cut d: 0.5 mm

Cutting oil: same as used in the cutting test for abrasion resistance

Judgement: Number of impacts required until loss occurs (number of passes by grooves)

The results are set forth in Table 2.

TABLE 1

| Specimen No. | Composition | | | WTiCN or TiC (wt %) | KN/KC + KN | a15 + KN | Sintering method | Temp. (° C.) |
|---|---|---|---|---|---|---|---|---|
| | $Al_2O_3$ (wt %) | Sintering aid (wt %) | (wt %) | | | | | |
| 1 | 10 | CaO 1.5 | $Y_2O_3$ 2 | 86.5 | 0.21 | 0.8 | H.P | 1,900 |
| 2 | 20 | MgO 1 | $Dy_2O_3$ 1 | 78 | 0.21 | 0.8 | HIP | 1,800 |
| 3 | 30 | MgO 1 | $ZrO_2$ 1 | 68 | 0.21 | 0.8 | HIP | 1,750 |
| 4 | 45 | CaO 1 | $Yb_2O_3$ 1 | 53 | 0.21 | 0.8 | NS | 1,700 |
| 5 | 30 | MgO 1 | $ZrO_2$ 1 | 68 | 0 | 0.8 | HIP | 1,750 |
| 6 | 30 | MgO 1 | $ZrO_2$ 1 | 68 | 0.1 | 0.8 | HIP | 1,750 |
| 7 | 30 | MgO 1 | $ZrO_2$ 1 | 68 | 0.33 | 0.8 | HIP | 1,750 |
| 8 | 30 | MgO 1 | $ZrO_2$ 1 | 68 | 0.45 | 0.8 | HIP | 1,750 |
| 9 | 30 | MgO 1 | $ZrO_2$ 1 | 68 | 0.21 | 0.62 | HIP | 1,750 |
| 10 | 30 | MgO 1 | $ZrO_2$ 1 | 68 | 0.21 | 0.9 | HIP | 1,750 |
| 11* | 0 | MgO 2 | $Y_2O_3$ 2 | 96 | 0.21 | 0.8 | H.P | 1,950 |
| 12* | 50 | MgO 1 | $ZrO_2$ 1 | 48 | 0.21 | 0.8 | NS | 1,700 |
| 13 | 30 | MgO 1 | $ZrO_2$ 1 | 68 | 0.52 | 0.8 | HIP | 1,750 |
| 14 | 30 | MgO 1 | $ZrO_2$ 1 | 68 | 0.21 | 0.5 | HIP | 1,750 |

TABLE 1-continued

| Specimen No. | Composition | | | WTiCN or TiC (wt %) | KN/KC + KN | a15 + KN | Sintering method | Temp. (° C.) |
|---|---|---|---|---|---|---|---|---|
| | Al₂O₃ (wt %) | Sintering aid (wt %) | | | | | | |
| 15 | 30 | MgO 1 | ZrO₂ 1 | 68 | 0.21 | 0.93 | HIP | 1,750 |
| 16 | 30 | MgO 1 | ZrO₂ 1 | 68 | 0.21 | 0.8 | HIP | 1,850 |
| 17* | 30 | MgO 0.3 | — | 69.7 | 0.21 | 0.8 | HIP | 1,750 |
| 18* | 30 | MgO 0.3 | — | 69.7 | 0.21 | 0.8 | H.P | 1,900 |
| 19* | 30 | MgO 3 | ZrO₂ 2 | 65 | 0.21 | 0.8 | NS | 1,750 |

The symbol * indicates a specimen deviating from the present invention.

TABLE 2

| Specimen No. | Average particle diameter of hard phase (μm) | Density ratio to theoretical value (relative density) (%) | Kc (MPa · m½) | Hv (Kgf/cm²) | Vn Abrasion on relief surface (mm) | Number of impacts |
|---|---|---|---|---|---|---|
| 1 | 0.5 | 98.5 | 5.7 | 2,280 | 0.09 | 2,800 |
| 2 | 0.4 | 99.6 | 6.1 | 2,270 | 0.12 | 3,500 |
| 3 | 0.3 | 99.7 | 6.4 | 2,250 | 0.15 | 4,000 |
| 4 | 0.2 | 99.1 | 6.0 | 2,210 | 0.21 | 3,700 |
| 5 | 0.3 | 99.6 | 6.0 | 2,280 | 0.10 | 3,000 |
| 6 | 0.3 | 99.7 | 6.2 | 2,260 | 0.12 | 3,600 |
| 7 | 0.3 | 99.4 | 6.6 | 2,220 | 0.18 | 4,700 |
| 8 | 0.3 | 99.2 | 6.4 | 2,190 | 0.20 | 5,300 |
| 9 | 0.3 | 99.5 | 6.1 | 2,210 | 0.19 | 3,700 |
| 10 | 0.3 | 99.4 | 6.3 | 2,240 | 0.17 | 3,800 |
| 11* | 0.8 | 98.7 | 5.2 | 2,240 | 0.13 | 800 |
| 12* | 0.2 | 99.6 | 5.3 | 2,150 | 0.34 | 2,300 |
| 13 | 0.3 | 99.3 | 6.2 | 2,150 | 0.28 | 5,800 |
| 14 | 0.3 | 99.7 | 6.8 | 2,160 | 0.31 | 3,800 |
| 15 | 0.3 | 99.0 | 6.0 | 2,140 | 0.31 | 2,900 |
| 16 | 0.7 | 99.9 | 6.8 | 2,170 | 0.29 | 3,200 |
| 17* | 0.3 | 96.5 | — | — | — | — |
| 18* | 0.9 | 99.2 | 6.7 | 2,110 | 0.47 | 2,800 |
| 19* | 0.3 | 99.4 | 6.2 | 2,190 | 0.45 | 4,300 |

The symbol * indicates a specimen deviating from the present invention.

These results show that the ceramic cutting tool specimens according to the present invention exhibit cutting properties excellent both in abrasion resistance and loss resistance.

What is claimed is:

1. A ceramic cutting tool comprising in its essential part a ceramic material, wherein said ceramic material consists essentially of a titanium carbonitride-based hard phase consisting essentially of titanium carbonitride having an average particle diameter of not more than 0.5 μm and an alumina-based phase consisting essentially of alumina having an average particle diameter of not more than 1.0 μm wherein said ceramic material satisfies the following relationships:

10 wt % ≦ weight of Al₂O₃ ≦ 45 wt %;

51 wt % ≦ weight of TiCN ≦ 89.5 wt %; and 96 wt % ≦ weight of Al₂O₃ + weight of TiCN ≦ 99.5 wt % wherein the weight of Al₂O₃ indicates the weight content of aluminum as calculated in terms of Al₂O₃; and weight of TiCN indicates the weight content of said titanium carbonitride hard phase, with the proviso that weight of TiCN is defined by weight of Ti+ weight of C+ weight of N in which weight of Ti, weight of C, and weight of N are the weight content of titanium component, carbon component and nitrogen component, respectively.

2. The ceramic cutting tool according to claim 1, wherein moles of N/(moles of C+ moles of N and moles of Ti/(moles of C+ moles of N are adjusted to range from more than 0 to not more than 0.5 and from not less than 0.6 to not more than 0.9, respectively, supposing that moles of Ti is the molar content of Ti component in said ceramic material, moles of C is the molar content of C component in said ceramic material, and moles of N is the molar content of N component in said ceramic material.

3. The ceramic cutting tool according to claim 1, wherein said ceramic material further comprises a sintering aid component mainly comprising metal oxides other than Al₂O₃ incorporated therein in an amount of from 0.5 to 4% by weight.

4. The ceramic cutting tool according to claim 1, wherein said ceramic material further comprises one or more metallic components selected from the group consisting of Mg, Ca, Zr, Hf and R (in which R comprises one or more rare earth elements selected from the group consisting of Sc, Y, La, Ce, Pr, Nd, Sm, Eu, Gd, Tb, Dy, Ho, Er, Tm, Yb and Lu) incorporated therein in a total amount of from 0.5 to 4% by weight as calculated in terms of MgO for Mg, CaO for Ca, ZrO₂ for Zr, HfO₂ for Hf, CeO₂ for Ce, Pr₆O₁₁ for Pr, Tb₄O₇ for Tb and M₂O₃ for the rest of the metallic components (in which M represents said rare earth elements excluding Ce, Pr and Tb).

5. The ceramic cutting tool according to claim 1, wherein said ceramic material exhibits a fracture toughness of not less than 5.6 MPam$^{1/2}$.

6. The ceramic cutting tool according to claim 1, wherein said ceramic material exhibits a Vickers hardness Hv of not less than 2,200.

7. The ceramic cutting tool according to claim 1, wherein said ceramic material satisfies the following relationship:

$$66 \text{ wt \%} \leq \text{weight of TiCN} \leq 79.5 \text{ wt \%}.$$

* * * * *